United States Patent
Rimini et al.

(10) Patent No.: US 8,804,871 B2
(45) Date of Patent: Aug. 12, 2014

(54) NON-LINEAR ADAPTIVE SCHEME FOR CANCELLATION OF TRANSMIT OUT OF BAND EMISSIONS

(75) Inventors: Roberto Rimini, San Diego, CA (US); Mohammad Omer, Atlanta, GA (US); Joseph Patrick Burke, Glenview, IL (US); Peter D. Heidmann, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 13/309,215

(22) Filed: Dec. 1, 2011

(65) Prior Publication Data

US 2012/0140860 A1 Jun. 7, 2012

Related U.S. Application Data

(60) Provisional application No. 61/418,748, filed on Dec. 1, 2010.

(51) Int. Cl.
| | |
|---|---|
| *H04B 15/00* | (2006.01) |
| *H04B 7/005* | (2006.01) |
| *H04L 25/49* | (2006.01) |
| *H03F 1/32* | (2006.01) |

(52) U.S. Cl.
USPC ........ 375/297; 375/296; 375/295; 455/114.2; 455/114.3; 455/91; 330/149

(58) Field of Classification Search
USPC ......... 375/219, 350, 232, 346, 297, 296, 295; 330/149; 455/114.2, 114.3, 91
See application file for complete search history.

(56) References Cited

U.S. PATENT DOCUMENTS

| | | | |
|---|---|---|---|
| 6,501,805 B1 * | 12/2002 | Twitchell ....................... | 375/285 |
| 6,687,235 B1 * | 2/2004 | Chu ............................. | 370/286 |
| 7,330,517 B2 | 2/2008 | Taler et al. | |
| 7,469,491 B2 * | 12/2008 | McCallister et al. ......... | 375/296 |
| 7,822,146 B2 | 10/2010 | Copeland | |

(Continued)

FOREIGN PATENT DOCUMENTS

WO WO2006068635 6/2006

OTHER PUBLICATIONS

International Search Report and Written Opinion—PCT/US2011/062952—ISA/EPO—Feb. 24, 2012.

(Continued)

*Primary Examiner* — Chieh M Fan
*Assistant Examiner* — Michelle M Koeth

(57) ABSTRACT

A method and apparatus for a non-linear adaptive scheme for transmit out of band emission cancellation is provided. Embodiments disclosed herein provide a method for removing unwanted transmitter emissions from a composite received signal. The method performs the steps of: extracting the I and Q samples from a modulator output; inputting the I and Q samples to a non-linear filter; applying weights to the non-linear filter outputs, combining the non-linear filter outputs to generate a broadband emission estimate; selecting a portion of a transmit emission in a desired portion of a receive band; subtracting an output of the non-linear filter from a composite signal; and feeding back a residual error to the non-linear filter; adapting the non-linear filter iteratively.

12 Claims, 5 Drawing Sheets

(56) References Cited

U.S. PATENT DOCUMENTS

| | | | |
|---|---|---|---|
| 8,320,868 B2* | 11/2012 | Pratt et al. | 455/296 |
| 2007/0217488 A1* | 9/2007 | Smaini et al. | 375/219 |
| 2010/0020900 A1* | 1/2010 | Cai et al. | 375/297 |
| 2010/0135449 A1 | 6/2010 | Row et al. | |
| 2010/0164620 A1* | 7/2010 | Hamada et al. | 330/149 |
| 2011/0103455 A1* | 5/2011 | Forrester et al. | 375/232 |
| 2011/0149714 A1 | 6/2011 | Rimini et al. | |

OTHER PUBLICATIONS

Li J., et al., "Adaptive Volterra Predistorters for Compensation of Non-linear Effects with Memory in OFDM Transmitters", 4th Annual Communication Networks and Services Research Conference (CNSR'06), Jan. 1, 2006, pp. 100-103, XP55019659, DOI: 10.1109/CNSR.2006.13, ISBN: 978-0-76-952578-5 the whole document.

* cited by examiner

NON-LINEAR ADAPTIVE SCHEME FOR CANCELLATION OF TRANSMIT OUT OF BAND EMISSIONS

CROSS-REFERENCE TO RELATED APPLICATION(S)

This application claims the benefit of U.S. Provisional Application Ser. No. 61/418,748, entitled "Non-Linear Digital Adaptive Scheme for Tx Out of Band (OOB) Emission Cancellation," filed on Dec. 1, 2010, which is expressly incorporated by reference herein in its entirety.

BACKGROUND

1. Field

The present disclosure relates generally to communication systems, and more particularly, to cancelling transmit out of band emissions using a non-linear adaptive scheme.

2. Background

Wireless communication systems are widely deployed to provide various types of communication content such as voice, data, and so on. These systems may be multiple-access systems capable of supporting communications with multiple users by sharing the available system resources (e.g., bandwidth and transmit power). Examples of such multiple-access systems include code division multiple access (CDMA) systems, time division multiple access (TDMA) systems, frequency division multiple access (FDMA), 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when the multiple antennas are available at the base station. In an FDD system, forward and reverse link transmissions are on different frequency regions.

As wireless technology advances the use of wideband and multi-carrier signals in the 4G and 3G systems has evolved and has resulted in less separation between the transmit and receive frequencies. Adequate spacing between the transmit and receive frequencies is required for frequency division duplex (FDD) systems to operate correctly, especially at sensitivity. When there is adequate separation between the transmit and receive frequencies, transmission of out of band (OOB) emissions that fall within the frequency band of the receive band are weak enough that those emissions are not a significant source of interference. This is not the case in a number of frequency band classes for 3G and 4G FDD system configurations.

This lack of separation can result in desensitization of the receiver chain by several dBs, which in turn can cause significant performance degradation and possible reduced cell coverage. The main component of the transmit out of band emission is represented by spectral regrowth that is cause by the intermodulation products excited by the power amplifier non-linearities. It is the distortion products in the transmit frequency band that are responsible for the spectral regrowth in the receive band due to reduced transmit and receive separation and limited duplex rejection. This effect is more severe in 4G systems, including Long Term Evolution (LTE) and High Speed Uplink Packet Access (HSUPA), where the duplexer separation can be limited.

There is a need in the art for mitigating the problem of transmit out of band emissions using a non-linear adaptive scheme to cancel the out of band emissions falling in the receiver band.

SUMMARY

Embodiments disclosed herein provide a method for removing unwanted transmitter emissions from a composite received signal. The method performs the steps of: extracting the I and Q samples from a modulator output; inputting the I and Q samples to a non-linear filter; applying weights to the non-linear filter outputs; combining the non-linear filter outputs to generate a broadband emission estimate; selecting a portion of a transmit emission in a desired portion of a receive band; subtracting an output of a frequency selection block from a composite signal; and adapting the non-linear filter iteratively based on the residual error feedback.

A further embodiment provides an apparatus for removing unwanted transmitter emissions from a composite received signal. The apparatus comprises a first processor for sampling the I and Q samples from a modulator. A non-linear filter is provided and is based on a linear combination of selected Volterra kernels through weights that are derived by mean square error calculations. The non-linear filter receives the I and Q transmitter samples as input signals. A second processor is also part of the apparatus and iteratively adapts the non-linear filter based on a residual error that is fed back to the non-linear filter. A third processor subtracts an output of the non-linear filter from a composite signal.

A still further embodiment provides an apparatus for removing unwanted transmitter emissions from a composite received signal. The apparatus comprises: means for extracting I and Q samples from a modulator output; means for inputting the I and Q samples to a non-linear filter; means for applying weights to the non-linear filter outputs; means for combining the non-linear filter outputs to generate a broadband emission estimate; means for selecting a portion of a transmit emission in a desired portion of a receive band; means for subtracting an output of a frequency selection block from a composite signal; means for feeding back a residual error to the non-linear filter; and means for adapting the non-linear filter iteratively based on fed-back error.

An additional embodiment provides a non-transitory computer-readable medium that comprises instructions, which when executed by a processor, cause the processor to perform the following operations: extract I and Q samples from a modulator output; input the I and Q samples to a non-linear filter; apply weights to the non-linear filter outputs; combine the non-linear filter outputs to generate a broadband emission estimate; select a portion of a transmit emission in a desired portion of a receive band; subtract an output of a frequency selection block from a composite signal; feed back a residual error to the non-linear filter; and adapt the non-linear filter iteratively based on fed-back error.

DETAILED DESCRIPTION

Figure 1:
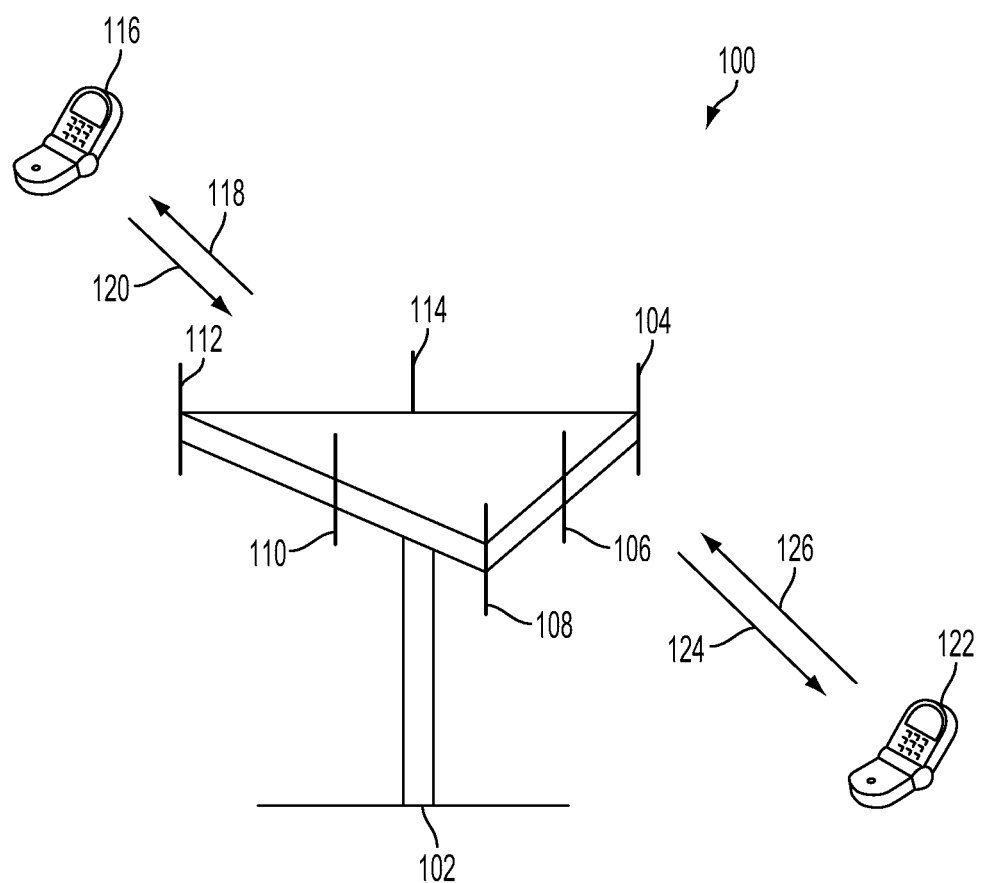
FIG. 1 illustrates a multiple access wireless communication system, in accordance with certain embodiments of the disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to man an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communication (GSM).

An OFDMA network may implement a radio technology such as Evolved UTRA (E-UTRA), the Institute of Electrical and Electronics Engineers (IEEE) 802.11, IEEE 802.16, IEEE 802.20, Flash-OFDAM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "$3^{rd}$ Generation Partnership Project" (3GPP). CDMA2000 is described in documents from an organization named "$3^{rd}$ Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE. Rather, the techniques described herein may be utilized in various application involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ration (PAPR) because of its inherent single carrier structure. SC-FDMA may be used in the uplink communications where the lower PAPR greatly benefits the mobile terminal in terms of transmit power efficiency.

FIG. 1 illustrates a multiple access wireless communication system 100 according to one aspect. An access point 102 (AP) includes multiple antenna groups, one including 104 and 106, another including 108 and 110, and an additional one including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over downlink or forward link 118 and receive information from access terminal 116 over uplink or reverse link 120. Access terminal 122 is in communication with antennas 106 and 108, where antennas 106 and 108 transmit information to access terminal 122 over downlink or forward link 124 and receive information from access terminal 122 over uplink or reverse link 126. In a Frequency Division Duplex (FDD) system, communication links 118, 120, 124, and 126 may use a different frequency for communication. For example, downlink or forward link 118 may use a different frequency than that used by uplink or reverse link 120.

Each group of antennas and/or the area in which they are designed to communicate is often referred to as a sector of the access point. In an aspect, antenna groups each are designed to communicate to access terminals in a sector of the areas covered by access point 102.

In communication over downlinks or forward links 118 and 124, the transmitting antennas of access point utilize beamforming in order to improve the signal-to-noise ratio (SNR) of downlinks or forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology. For certain aspects, either the AP 102, or the access terminals 116, 122 may utilize the proposed transmit echo cancellation technique to improve performance of the system.

Figure 2:
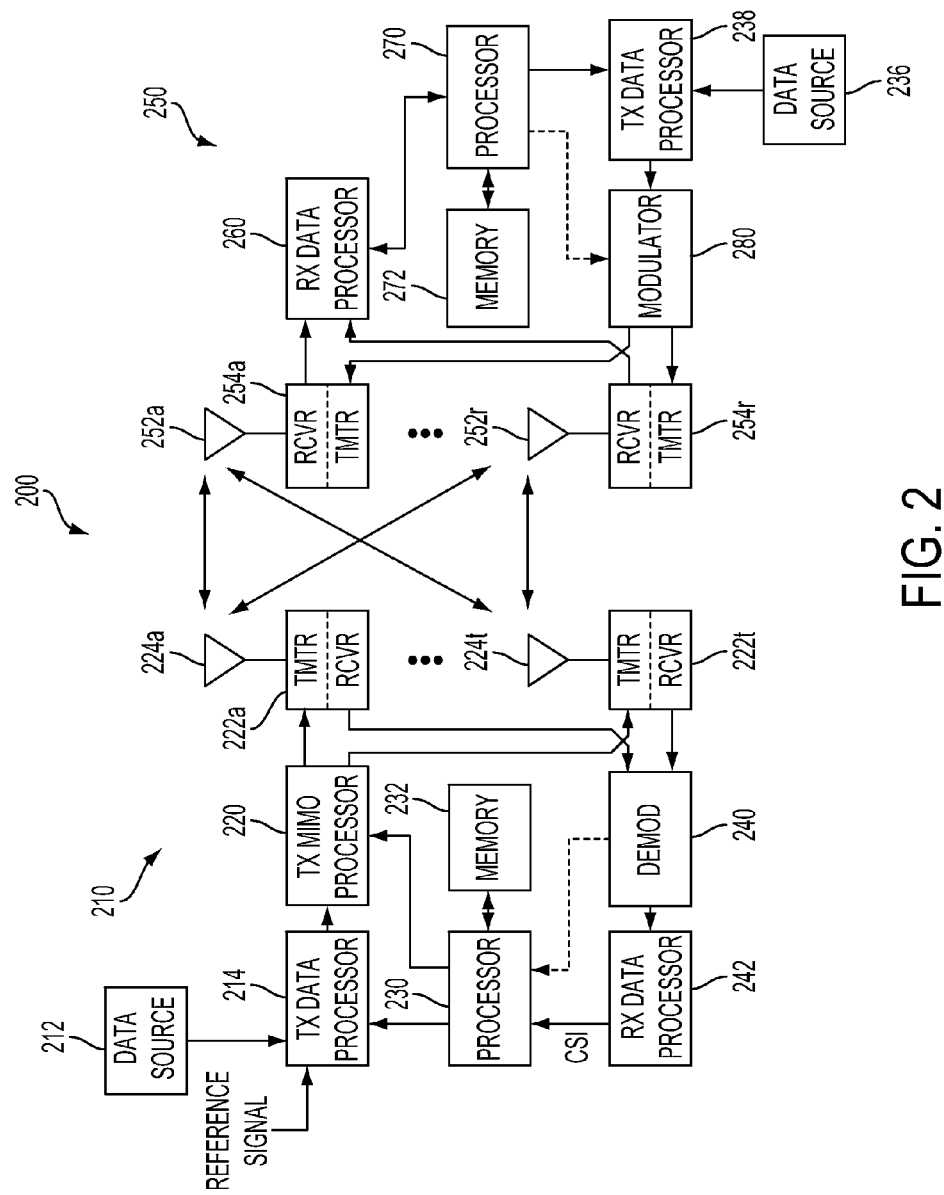
FIG. 2 illustrates a block diagram of a communication system in accordance with certain embodiments of the disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214. An embodiment of the disclosure is also applicable to a wireline (wired) equivalent of the system shown in FIG. 2.

In an aspect, each data stream is transmitted over a respective transmit antenna. TX data processor 214 formats, codes, and interleaves the traffic data for each data stream based on a particular coding scheme selected for that data stream to provided coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g. a Binary Phase Shift Keying (BPSK), Quadrature Phase Shift Keying (QPSK), M-PSK in which M may be a power of two, or M-QAM, (Quadrature Amplitude Modulation)) selected for that data stream to provide modulation symbols. The data rate, coding, and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222*a* through 222*t*. In certain aspects TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222*a* through 222*t* are then transmitted from $N_T$ antennas 224*a* through 224*t*, respectively.

At receiver system 250, the transmitted modulated signals are received by the $N_R$ antennas 252*a* through 252*r* and the received signal from each antenna 252 is provided to a respective receiver (RCVR) 254*a* through 254*r*. each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX processor 260 is complementary to that performed by TX MIMO processor 220 and TX data processor 214 at transmitter system 210.

Processor 270, coupled to memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

The method and apparatus described herein "recreates" the non-linear behavior of the power amplifier using a digital non-linear filter. In the method, when the filter is excited by the transmit signal it reproduces the same out of band intermodulation products of the power amplifier. This reproduction is then cancelled at the baseband frequency. First the same spectral regrowth is reproduced that was produced by the power amplifier, and this spectral regrowth is digitally subtracted from the corrupted receive signal. As a result, the transmit out of band emission component is removed from the received signal.

Figure 3:
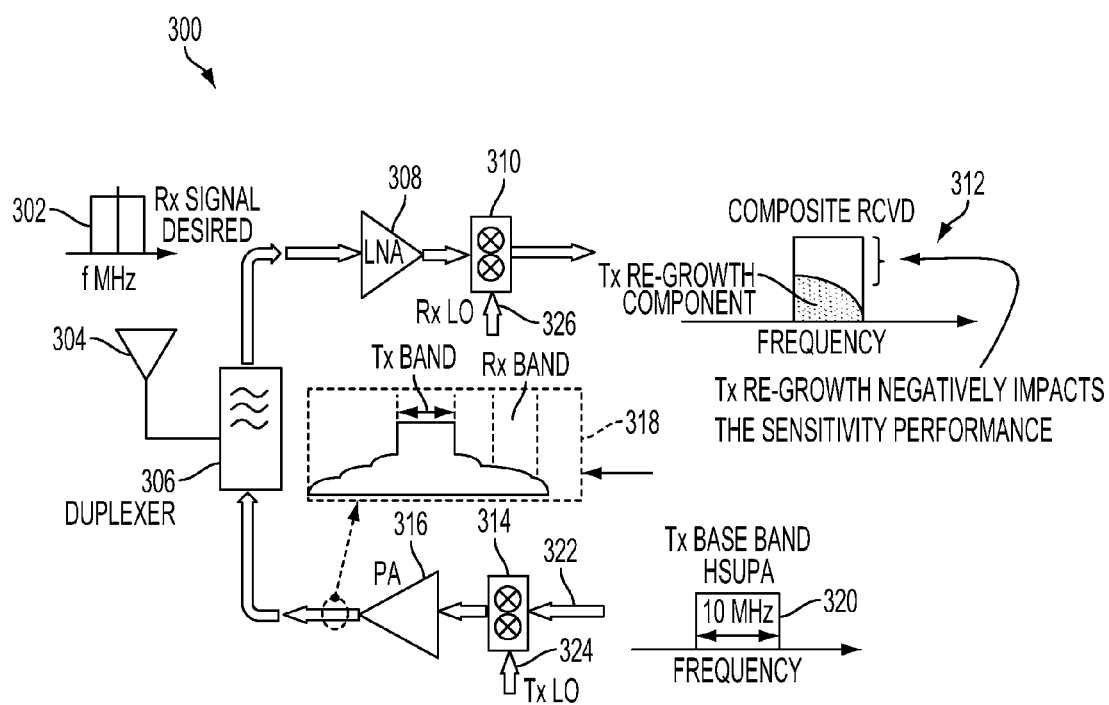
FIG. 3 is a diagram illustrating how a transmit out of band emission arises in accordance with certain embodiments of the disclosure.

FIG. 3 illustrates how transmit out of band emissions occur in a transmit and receive system, 300. A desired received signal 302 is received by antenna 304. Concurrently, a transmission signal 322 is being prepared for transmission. The transmission signal 322, has a frequency within a base band frequency range, as illustrated at 320. Signal 322 is passed through a mixer 314, where it is mixed with a transmit local oscillator (Tx LO) signal, 324. The resulting signal is passed to power amplifier 316 for amplification. The amplified signal 318 is passed to duplexer 306. A portion of the spectral regrowth generated by power amplifier 316 non-linearities lies in the desired receive band as depicted in 318. The composite receive signal includes a transmit regrowth component as shown in 312. This transmit out of band emission may obscure portions of the desired receive signal, as element 312 illustrates. After duplexing this composite signal is passed to the low noise amplifier (LNA) 308 for amplification. The composite receive signal and transmit emission are then passed to mixer 310, to be down-converted to base band.

The transmit out of band emission intermodulation distortion may be important in communication systems that operate in compliance with the LTE standard due to the vulnerability of the primary synchronization channel (PSCH) and synchronization channel (SCH) to interference. Reduced duplexer separation, as is found in several 3GPP bands, results in reduced transmit emission rejection in the filter 306.

This lack of separation may result in desensitization of the receiver chain by several dBs, which in turn may cause significant performance degradation and possible reduced cell coverage. The main component of the transmit out of band emission is represented by spectral regrowth, as illustrated by element 318 of FIG. 3. This spectral regrowth is caused by the intermodulation products excited by the power amplifier 316 non-linearities. It is the distortion products in the transmit frequency band that are responsible for the spectral regrowth in the receive band due to the reduced transmit and receive separation and limited duplex rejection.

For some embodiments, nonlinear behavior of a system may be characterized by a Volterra series, as follows:

$$y[k] = \sum_{m_1=0}^{M_1-1} h_1[m_1]x[k-m_1]$$

$$= \sum_{m_1=0}^{M_2-1}\sum_{m_2=0}^{M_2-1} h[m_1, m_2]x[k-m_2] + \ldots$$

$$\sum_{m_1=0}^{M_p-1}\sum_{m_2=0}^{M_p-1}\sum_{m_p=0}^{M_p-1} h[m_1, m_2 \ldots m_p]\prod_{i=1}^{M_p} x[k-m_i]$$

in which $M_1$, $M_2$, and $M_p$ represent the memory set associated with each term of the Volterra series. P represents order of the power series. h[•] represents the impulse response of the system, and x(•) represents an input signal.

Figure 4:
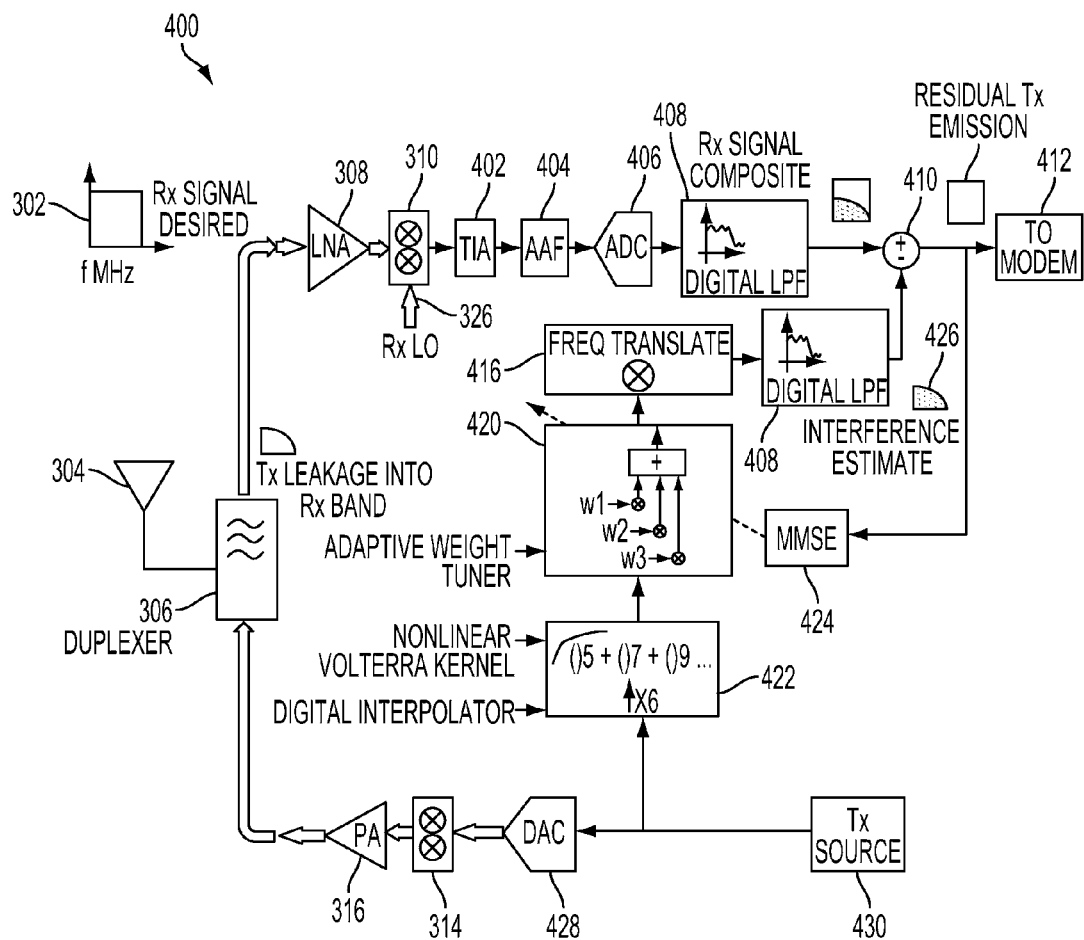
FIG. 4 illustrates an apparatus for cancelling transmit out of band emissions using a non-linear adaptive scheme in accordance with certain embodiments of the disclosure.

As illustrated in FIG. 4, a signal is received by an antenna 304. The signal may be a combination (composite) of the intended receive signal and the transmit out of band signal. The transmit out of band signal falling in receive band may be the result of transmit non-linearity and limited isolation between RX and receive claims.

The signal is downconverted to baseband after passing through low noise amplifier (LNA) 308 and mixer 310. Then the signal is passed through the trans-impedance amplifier (TIA) 402, anti-aliasing filter (AAF) 404 and analog to digital converter (ADC) 406. The AAF 404 may filter the out-of-band intermediate frequencies (IF) before down-sampling, in order to reduce the aliasing effect. The digital low pass filter (LPF) 408 filters out the high frequency components from the signal that is converted to digital through an analog to digital converter.

The process of cancelling the transmit out of band emission begins with a digital interpolator to up sample the transmit frequency followed by a non-linear Volterra filter made of several kernels 422. This signal is passed to the adaptive weight tuner 420 for modification. Adaptive weight tuner 420 passes the signal to the frequency translator 416. The frequency translator provides frequency translation, after which an interference estimate 426 is passed to the digital low pass filter 408. The interference estimate 426 is then used to cancel the interference from the composite received signal. The error signal is then feed back to the minimum mean square error (MMSE) calculation block 424 to generate appropriate weights for use by the adaptive weight tuner 420 and Volterra kernel 422.

A signal may be prepared for transmission by a transmit source 430. This transmit source passes through a Volterra filter, possibly after going through an Inverse Fast Fourier Transform (IFFT) for an LTE system. The Volterra filter generates the output signal based on the equation above and generates second order, third order, and fourth order and up to 'p' order of the transmitted, multiplying them with weights adaptively estimated using MMSE. The values of the MMSE weights used by the adaptive weight tuner 420 may be calculated by minimizing the mean square error cost function associated with the error signal. The error signal is generated as follows: Error=corrupted receive signal–interference estimate, 426 in FIG. 4.

For certain embodiments, minimizing the power of the error signal ensures that portion of the composite signal which is the most correlated with the reconstructed transmit out of band emission is cancelled. In general, the least mean square, recursive least squares, or other algorithm may be used to minimize the mean square error.

In an embodiment, the non-linear intermodulation cancellation process proceeds as follows: (1) spill out the I and Q transmit samples at the modulator output and feed the I and Q transmit samples to the non-linear filter based on a truncated Volterra series; (2) the output of the non-linear filter is a mean square error reproduction of the transmit out of band emission that was present in the receive base band. This out of band emission is then subtracted from the composite signal. (3) The residual error remaining after cancelling the out of band emission is then fed back to allow iterative adaptation of the weights, also known as Volterra kernels, using standard recursive algorithms for mean square error minimization. (4) A digital frequency shifter, followed by a digital low-pass filter is inserted at the output of the non-linear Volterra filter to select the portion of the transmit emission that falls in the receive channel band, as seen from the base band.

Figure 5:
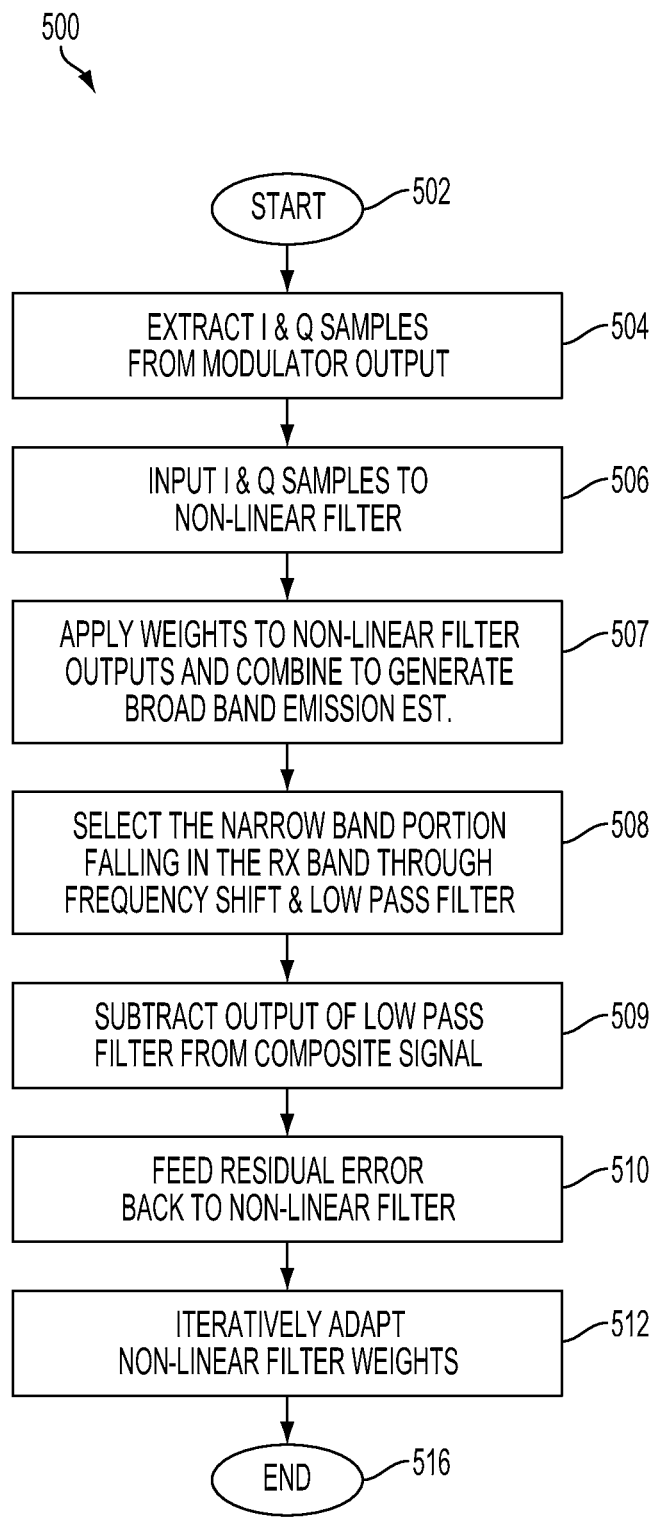
FIG. 5 is a flow diagram of a method for cancelling transmit out of band emissions using a non-linear adaptive scheme in accordance with certain embodiments of the disclosure.

FIG. 5 is a flow chart of the steps of the method described above. The start of the process 500, is the start step 502. In step 504 the I and Q samples are extracted from the modulator output. These extracted I and Q samples are then input to the non-linear filter in step 506 (1) Weights are applied to the output of non-linear filter and weighted signals are combined as in step 507. (2). The output of the combiner is fed to a free shift to a low pass filter to select the portion of the transmit emission falling in receive band as in step 508. After processing as described above, the output of the low pass filter is subtracted from the composite signal in step 509. The residual error is then fed back to the non-linear filter to allow the weights to be adapted, in step 510. The weights are iteratively adapted in step 512.

In an embodiment, the non-linear intermodulation cancellation process proceeds as follows: (1) spill out the I and Q transmit samples at the modulator output and feed the I and Q transmit samples to the non-linear filter based on a truncated Volterra series; (2) the output of the non-linear filter is a mean square error reproduction of the transmit out of band emission that was present in the receive base band. This out of band emission is then subtracted from the composite signal. (3) The residual error remaining after cancelling the out of band emission is then fed back to allow iterative adaptation of the weights, also known as Volterra kernels, using standard recursive algorithms for mean square error minimization. (4) A digital frequency translator 416, followed by a digital lowpass filter 408 are also inserted at the output of the non-linear Volterra filter 422 to select the portion of the transmit emission that falls in the receive channel band, as seen from the base band.

The methods and apparatus of the present invention may also be applied to the problem of co-existence in co-located radios. This problem arises when a Bluetooth device is used with or near an LTE radio. The Bluetooth band is close to the LTE band and spectral regrowth may occur within the Bluetooth band, causing problems. The amplifier non-linearities are present at the receive low noise amplifier. These non-linearities can be digitally reproduced and subtracted out in the digital base band signal.

Certain embodiments of the disclosure proposed an adaptive digital non-linear device that mimics the transmit out of band emissions produced and allows them to be subtracted from the desired signal. The apparatus uses a non-linear adaptive filter based on a Volterra series to mitigate the transmit out of band emissions that are generated by the transmit non-linearity and are problematic for FDD systems. The proposed scheme may significantly reduce transmit out of band emission problems and consumptively improve sensitivity of the receive chain when the transmit power level is high.

In addition, the suggested transmit out of band subtraction technique may relax the costly linearity requirements of a transmit chain. Utilizing the proposed scheme may result in lower power consumption and smaller size of the transmit upconversion chain. The proposed scheme has limited complexity due to an appropriate down selection of the Volterra kernels of the Volterra series set forth in the section above directed towards FIG. 3, and may be implemented fully in digital hardware. The proposed scheme may also be suitable for recursive weight estimation such as least mean square (LMS), recursive least square (RLS), and similar algorithms.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for removing unwanted transmitter emissions from a composite received signal, comprising:
   extracting digitally I and Q samples from a modulator output;
   inputting digitally the I and Q samples to a non-linear digital adaptive filter;
   applying digitally weights to the non-linear digital adaptive filter outputs;
   combining the non-linear digital adaptive filter outputs digitally to generate a baseband reproduction of the unwanted transmitter emissions;
   selecting a portion of the reproduction that falls in a desired portion of a receive band by frequency shifting and low pass filtering the reproduction;
   subtracting digitally the lowpass filtered and frequency shifted reproduction from the composite received signal; and
   adapting the non-linear digital adaptive filter iteratively, by iteratively adapting the weights applied to the non-linear digital adaptive filter, wherein the weights are a representation of selected Volterra kernels.

2. The method of claim 1, wherein the adaptation of the non-linear filter is based on a mean square error calculation and minimizes the mean square error.

3. The method of claim 1, wherein the composite signal is in a receive frequency band.

4. An apparatus for removing unwanted transmitter emissions from a composite received signal, comprising:
   a first processor for digitally sampling I and Q samples from a modulator;
   a non-linear digital adaptive filter based on a linear combination of selected Volterra kernels through weights derived by mean square error calculations, that receives the I and Q transmitter samples as input signals, and outputs a reproduction of the unwanted transmitter emissions;
   a second processor for selecting a desired portion of the reproduction by frequency shifting and low pass filtering the reproduction, and digitally subtracting the selected desired portion from a composite base band signal; and
   a third processor for iteratively adapting the non-linear digital adaptive filter based on a residual error fed back to the non-linear filter to iteratively adapt the weights applied to the non-linear digital adaptive filter.

5. An apparatus for removing unwanted transmitter emissions from a composite received signal, comprising:
   a first processor for digitally sampling I and Q samples from a modulator;
   a non-linear filter based on a linear combination of selected Volterra kernels through weights derived by mean square error calculations, that receives the I and Q transmitter samples as input signals;
   a second processor for digitally subtracting an output of the non-linear filter from a composite base band signal; and
   a third processor for iteratively adapting the non-linear filter based on a residual error fed back to the non-linear filter to iteratively adapt the weights applied to the non-linear filter; and a digital frequency shifter and digital low-pass filter inserted at the output of the non-linear filter.

6. The apparatus of claim 4, wherein the Volterra kernels are stored in at least one memory element.

7. An apparatus for removing unwanted transmitter emissions from a composite received signal, comprising:
- means for digitally extracting I and Q samples from a modulator output;
- means for digitally inputting the I and Q samples to a non-linear digital adaptive filter;
- means for digitally applying weights to the non-linear digital adaptive filter outputs;
- means for digitally combining the non-linear digital adaptive filter outputs to generate a base band reproduction of the unwanted transmitter emissions;
- means for selecting a portion of the reproduction that falls in a desired portion of a receive band by frequency shifting and low pass filtering the reproduction;
- means for digitally subtracting the output of the means for selecting from the composite received signal;
- means for feeding back the residual error;
- means for adapting the non-linear digital adaptive filter iteratively based on the minimization of Mean Square Error power, by iteratively adapting the weights applied to the non-linear digital adaptive filter, wherein the weights are a representation of selected Volterra kernels.

8. The apparatus of claim 7, wherein the means for adapting the non-linear filter is based on a mean square error calculation and mean square error minimization.

9. The apparatus of claim 7, wherein the composite signal operated on by the means for subtracting an output of the non-linear filter from a composite signal is in a receive frequency band.

10. A non-transitory computer-readable medium comprising instructions, which when executed by a processor cause the processor to perform the following operations:
- extract digitally I and Q samples from a modulator output;
- input digitally the I and Q samples to a non-linear digital adaptive filter;
- apply weights digitally to the non-linear digital adaptive filter output;
- combine the non-linear digital adaptive filter outputs digitally to generate a base band reproduction of unwanted transmitter emissions;
- select a portion of the reproduction by frequency shifting and low pass filtering the reproduction;
- subtract digitally the lowpass filtered and frequency shifted reproduction from a composite signal; and
- adapt the non-linear digital adaptive filter iteratively, by iteratively adapting the weights applied to the non-linear digital adaptive filter, wherein the weights are a representation of selected Volterra kernels.

11. The non-transitory computer-readable medium of claim 10, wherein the adapting of the non-linear filter is based on a mean square error calculation and minimizes the mean square error.

12. The non-transitory computer-readable medium of claim 10, wherein the composite signal is in a receive frequency band.

* * * * *